US012532052B2

(12) United States Patent
Benyamin

(10) Patent No.: US 12,532,052 B2
(45) Date of Patent: Jan. 20, 2026

(54) SYSTEMS AND METHODS FOR CONTEXT-BASED VIDEO GENERATION

(71) Applicant: Project Aeon, Inc., Culver City, CA (US)

(72) Inventor: Daniel Benyamin, Los Angeles, CA (US)

(73) Assignees: Project Aeon, Inc.; Artema Labs, Inc.

( * ) Notice: Subject to any disclaimer, the term of this patent is extended or adjusted under 35 U.S.C. 154(b) by 44 days.

(21) Appl. No.: 18/739,203

(22) Filed: Jun. 10, 2024

(65) Prior Publication Data

US 2024/0414414 A1   Dec. 12, 2024

Related U.S. Application Data

(60) Provisional application No. 63/507,407, filed on Jun. 9, 2023.

(51) Int. Cl.
*H04N 21/81*   (2011.01)
(52) U.S. Cl.
CPC ................... *H04N 21/816* (2013.01)
(58) Field of Classification Search
CPC ..................................................... H04N 21/816
See application file for complete search history.

(56) References Cited

U.S. PATENT DOCUMENTS

| | | | | |
|---|---|---|---|---|
| 11,076,198 B2* | 7/2021 | Kalish | ...................... | G11B 27/11 |
| 12,230,290 B2* | 2/2025 | Wang | ..................... | G06F 40/263 |
| 2013/0272679 A1* | 10/2013 | Cavalcanti | ........... | G11B 27/034 |
| | | | | 386/282 |
| 2018/0249193 A1* | 8/2018 | Zhang | ............... | H04N 21/26603 |
| 2023/0319321 A1* | 10/2023 | Ickin | .................... | H04N 19/154 |
| | | | | 382/253 |
| 2025/0191394 A1* | 6/2025 | Han | ....................... | G06V 20/47 |

* cited by examiner

*Primary Examiner* — Mulugeta Mengesha
(74) *Attorney, Agent, or Firm* — KPPB LLP

(57) ABSTRACT

One embodiment includes a method for generating context-based video. The method includes receiving an input describing a video to be generated, determining a theme of the video to be generated based on the input, transmitting a request video to be generated based on the determined theme and the input, selecting a template from a template server based on the request, generating a video based on the selected template and the input, evaluating if the generated video is satisfactory, where the evaluating if the generated video is satisfactory further includes extracting a frame of the generated video, describing the extracted frame in text, identifying portions of the extracted frame that are unsatisfactory based on description of the extracted frame, locating information relevant to the unsatisfactory portions of the extracted frame, updating unsatisfactory portions of the extracted frame with located information, and outputting the generated video that is deemed satisfactory.

20 Claims, 10 Drawing Sheets

SYSTEMS AND METHODS FOR CONTEXT-BASED VIDEO GENERATION

CROSS-REFERENCE TO RELATED APPLICATIONS

The current application claims the benefit of and priority under 35 U.S.C. § 119(e) to U.S. Provisional Patent Application No. 63/507,407 entitled "Systems and Methods for Context-Based Video Generation" filed Jun. 9, 2023. The disclosure of U.S. Provisional Patent Application No. 63/507,407 is hereby incorporated by reference in its entirety for all purposes.

FIELD OF THE INVENTION

The present invention generally relates to artificial intelligence, and, more specifically, using large language models to generate video content based on text.

BACKGROUND

Videos have been proven to increase retention of information, making them effective in conveying messages to different audiences. As the human brain can process visuals up to 60000 times faster than text, videos are generally more engaging and interesting and can successfully capture the attention of their audiences. Various types of video content, including short-form videos, are widely used in marketing to provide a medium for audiences to consume information quickly and build brand engagement. Video content can help form associations between the brand and the audience.

Large language models (LLMs) are deep learning algorithms that can recognize, summarize, translate, predict, and generate text. LLMs learn from vast amounts of data, which gives them the ability to both understand the massive amounts of words in different languages and also learn the relationships and concepts between the words. LLMs can be trained to predict and generate content and may be customized for different use cases.

Text-based video generation refers to a process that takes a natural language description as input and uses machine learning algorithms to generate a video that matches the input description. Text-based video generation uses machine learning algorithms to predict movement patterns within video frames based on training data, which can be demanding on computing resources.

SUMMARY OF THE INVENTION

Systems and methods for context-based video generation in accordance with embodiments of the invention are illustrated. One embodiment includes a system for generating context-based video. The system includes a language model server including a set of one or more processors configured to receive an input describing a video to be generated, determine a theme of the video to be generated based on the input, request the video to be generated based on the determined theme and the input, and query a video generation server to determine if the generated video is satisfactory. The system further includes a video generation server including a set of one or more processors configured to receive the video generation request, select a template from a template server based on the request, generate a video based on the selected template and the input, and evaluate if the generated video is satisfactory in response to the query from the language model server. The system further includes an image-to-text server including a set of one or more processors configured to extract a frame of the generated video, describe the extracted frame in text, identify portions of the extracted frame that are unsatisfactory based on description of the extracted frame, locate information relevant to the unsatisfactory portions of the extracted frame, and update unsatisfactory portions of the extracted frame with located information.

In another embodiment, the template server includes metadata to Adobe After Effects templates.

In a further embodiment, the image-to-text server includes a BLIP-2 model.

In still another embodiment, evaluating whether the generated video is satisfactory includes describing the generated video in text, and scoring the similarity of the description of the video against the input text.

In a still further embodiment, the language model server is further configured to generate summaries of the input text, wherein the generated summaries are labeled to correct hallucination errors.

In yet another embodiment, the language model server is further configured to determine whether the template selected by the video generation server is satisfactory.

In a yet further embodiment, wherein the language model server determines whether the template selected by the video generation server is satisfactory by querying the video generation server, wherein the video generation server answers the queries from the language model server by performing visual question answering.

In another additional embodiment, the video generation server generates the video by rendering the video with placeholders in portions of each frame of the generated video.

In a further additional embodiment, locating information relevant to the unsatisfactory portions of the extracted frame includes searching, using the language model server, for information from web-based sources other than the input text to locate information to be used to update the unsatisfactory portions of the extracted frame.

In another embodiment again, updating unsatisfactory portions of the extracted frame with located information is performed repeatedly until the language model server determines the generated video is satisfactory.

One embodiment includes a method for generating context-based video. The method includes receiving an input describing a video to be generated, determining a theme of the video to be generated based on the input, and transmitting a request video to be generated based on the determined theme and the input. The method further includes selecting a template from a template server based on the request, and generating a video based on the selected template and the input. The method further includes evaluating if the generated video is satisfactory, where the evaluating if the generated video is satisfactory further includes extracting a frame of the generated video, describing the extracted frame in text, identifying portions of the extracted frame that are unsatisfactory based on description of the extracted frame, locating information relevant to the unsatisfactory portions of the extracted frame, and updating unsatisfactory portions of the extracted frame with located information. The method further includes outputting the generated video that is deemed satisfactory.

One embodiment includes a system for generating context-based video. The system includes a language model server including a set of one or more processors configured to receive an input describing a video to be generated, request the video to be generated based on the determined theme and the input, and query a video generation server to determine if the generated video is satisfactory. The system further includes a video generation server including a set of one or more processors configured to receive the video generation request, receive a description of a template to be used for the video to be generated, select a template from a template server based on the request and the description, generate a video based on the selected template and the input, and evaluate if the generated video is satisfactory in response to the query from the language model server. The system further includes an image-to-text server including a set of one or more processors configured to extract a frame of the generated video, describe the extracted frame in text, identify portions of the extracted frame that are unsatisfactory based on description of the extracted frame, locate information relevant to the unsatisfactory portions of the extracted frame, and update unsatisfactory portions of the extracted frame with located information.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Videos can be powerful tools to convey information in the Internet age. A captivating video can provide information to an audience succinctly and effectively. Individuals may create videos and provide content for a variety of purposes. Businesses can leverage videos to build trust with audiences and subsequently promote their products or services. However, creating such promotional videos can be a painstaking process, as it can be resource-intensive to create every video from scratch, often requiring dedicated personnel to do so. Further, creating informational videos that are suitable to the right context, such that the videos are appealing and engaging to the audiences, may also be a challenging task.

Systems and methods in accordance with various embodiments of the invention can remedy these problems by utilizing a plurality of machine learning models to create engaging informational videos based on text inputs that cater to the required contexts. In numerous embodiments, a large language model (LLM) is used to summarize the text inputs. Text inputs may be in a number of formats, including but not limited to websites, slide decks, and/or news articles. In several embodiments, the LLM is able to summarize the text inputs in a manner that retains the structure of the original text inputs. For example, website summaries may be structured like the structure of the original web page. Slide decks may be summarized according to the various slides. News articles may be summarized according to the logical sections of the article.

Figure 1:
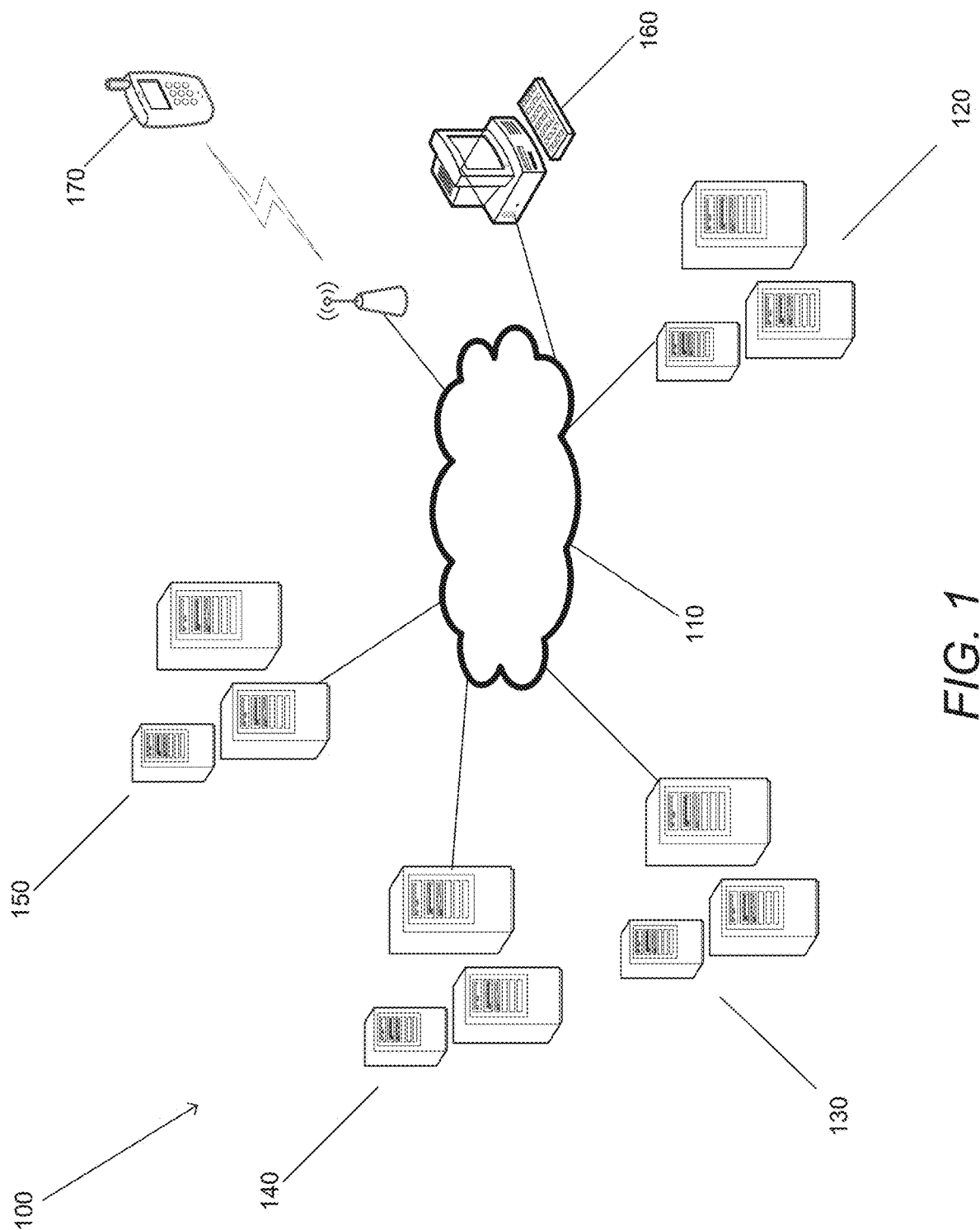
FIG. 1 illustrates a network diagram of a context-based video generation system in accordance with an embodiment of the invention.

A system for context-based video generation in accordance with an embodiment of the invention is illustrated in FIG. 1. In numerous embodiments, system 100 includes a communication network 110. The communication network 110 may be a network such as the Internet that allows devices connected to the network 110 to communicate with other connected devices. In numerous embodiments, system 100 includes an LLM deployed on LLM server system 120. The LLM deployed on the LLM server system 120 is capable of summarizing the input text. In some embodiments, the LLM is the GPT-4 model. System 100 may include a video generation server system 130. The LLM server system 120 can interface with the video generation server system 130, where the LLM communicates the information used to generate informational videos to the video generation server system 130.

In several embodiments, system 100 includes template server system 140. In some embodiments, template server system 140 includes a memory that stores metadata of templates that can be used to generate videos. In selected embodiments, template server system 140 contains metadata to Adobe After Effects templates. As can readily be appreciated, the specific templates that are utilized are largely dependent upon the requirements of a given application. The LLM server system 120 can direct the video generation server system 130 to find an appropriate template that may be used to generate the informational video using metadata from the template server system 140. The template server system 140 can communicate with other template providers for additional templates that may be used for video generation. The video generation server system 130 can generate videos using templates located from the template server system 140 and information provided to by the LLM server system 120. Videos generated and updated by the system 100 can contain at least one video track and at least one audio track.

System 100 may include an image-to-text server system 150. In selected embodiments, at least an object segmentation model, an object detection model, and an image-to-text model are deployed on the image-to-text server system 150. The image-to-text model may be a BLIP-2 model. The image-to-text server system 150 can describe the video generated by the video generation server system 130 in text and interface with the LLM server system 120 through queries to determine if the generated video is satisfactory. In many embodiments, a determination is made by scoring the similarity of the description of the video against an input text prompt. As can readily be appreciated, the specific manner in which a determination of whether a produced video is satisfactory is performed is largely dependent upon the requirements of a given application. If system 100 deems the generated video unsatisfactory upon receiving the queries from the image-to-text server system 150, the LLM server system 120 can be utilized to locate additional details that may be used and/or provide additional instructions to video generation server system 130 to update the generated video until it becomes satisfactory.

Server systems 120, 130, 140, and 150 are connected to the communication network 110. Each of the server systems 120, 130, 140, and 150 can be a group of one or more servers communicatively connected to one another via internal networks that execute processes that provide cloud services to users over the communication network 110. As can readily be appreciated, the number of separate server systems and the manner in which they communicate is largely dependent upon the requirements of specific applications in accordance with various embodiments of the invention.

One skilled in the art will recognize that a context-based video generation system may exclude certain components and/or include other components that are omitted for brevity without departing from this invention.

For purposes of this discussion, cloud services are one or more applications that are executed by one or more server systems to provide data and/or executable applications to devices over a network. The server systems 120, 130, 140, and 150 are shown to each have three servers in the internal network. However, the server systems 120, 130, 140, and 150 may include any number of servers and any additional number of server systems may be connected to the communication network 110 to provide cloud services. In accordance with various embodiments of this invention, a context-based video generation system that uses systems and methods that generate context-based video in accordance with an embodiment of the invention may be provided by a process being executed on a single server system and/or a group of server systems communicating over communication network 110.

In many embodiments, system 100 includes user devices 160 and 170. Users may use user devices 160 and 170 that connect to the network 110 to perform processes that generate context-based video in accordance with various embodiments of the invention. In the illustrated embodiment, the user device 160 is shown as a desktop computer that is connected via a conventional "wired" connection to the communication network 110. However, the user device 160 may be a desktop computer, a laptop computer, a smart television, an entertainment gaming console, or any other device that connects to the communication network 110 via a "wired" connection. The user device may also be a mobile device 170 that connects to communication network 110 using a wireless connection. A wireless connection is a connection that uses Radio Frequency (RF) signals, Infrared signals, or any other form of wireless signaling to connect to the communication network 110. In the example of this figure, the mobile device 170 is a mobile telephone. However, the mobile device 170 may be a mobile phone, Personal Digital Assistant (PDA), a tablet, a smartphone, or any other type of device that connects to communication network 110 via a wireless connection without departing from this invention.

As can readily be appreciated the specific system used to generate context-based video is largely dependent upon the requirements of a given application and should not be considered as limited to any specific computing system(s) implementation.

Content Generation

Figure 2:
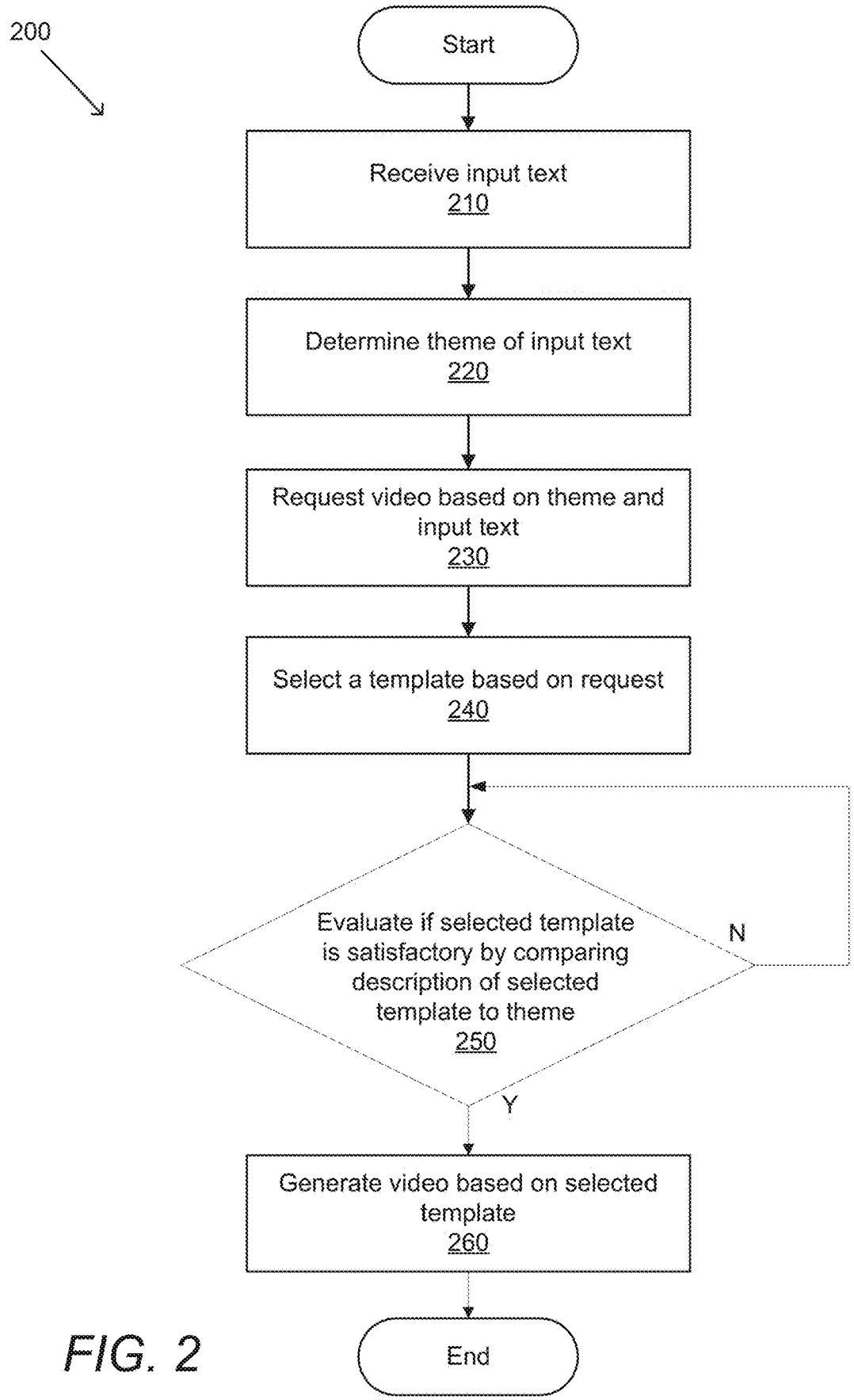
FIG. 2 is a flow chart illustrating a process for selecting a template and generating a video based on the selected template in accordance with an embodiment of the invention.

To generate content that is not only accurate but engaging to audiences, systems and methods in accordance with various embodiments of the invention can coordinate between a plurality of machine learning models and servers to select and compile the most appropriate parts necessary to generate the content. This can include selecting a template on which a video may be based. A process for selecting a template to use in the generation of content in accordance with an embodiment of the invention is illustrated in FIG. 2.

Process 200 receives (210) input text. The input text may be basic text, a website, a slide deck, and/or a news article. In several embodiments, the input text is received by the LLM at the LLM server system 120. Process 200 determines (220) a theme of the input text. In many embodiments, the theme is determined by the LLM, where the LLM summarizes the received input text. The determined theme can be used to generate a video of the appropriate context. Process 200 can request (230) that a video be generated based on the determined theme and the received input text. In many embodiments of the invention, the LLM deployed at the LLM server system 120 can make this request to the video generation server system 130.

LLMs may suffer from hallucinations as they process input texts. Hallucination in the context of artificial intelligence refers to responses that are generated with a high confidence level that is inconsistent with its training data (e.g., the output text states facts that are incorrect). For example, LLMs processing input texts may start referring to a person with the last name "Cook" in the input text as "Tim Cook," the Chief Executive Officer of Apple, even though the input text has no mention of Tim Cook. The reason for such a hallucination is that extensive references to "Tim Cook" in the training data of the LLM can result in the LLM incorrectly creating a high likelihood that the word Cook is associated with the word Tim. In some embodiments, the summaries generated by the LLM may require additional labeling and correction by a human oracle in the loop to correct the hallucination errors made by the LLMs. Natural language processing methods may be employed for additional correction.

Process 200 can select (240) a template based on the request. In many embodiments, the video generation server system 130, upon receiving the request sent from the LLM, may interface with the template server system 140 to select a template based on the determined theme and input text. Video generation server systems in accordance with several embodiments may receive descriptions of a template to be used and select the template based on the received descriptions. Description of templates may be received from additional human input and/or an external server system. Templates may be from other sources, and the video generation server system 130 can locate and retrieve templates using metadata stored in the template server system 140 that points to the sources of the templates. Process 200 can evaluate (250) whether the selected template is satisfactory by comparing the template to the determined theme. In numerous embodiments, the selected template is passed to the image-to-text server system 150. The image-to-text server system 150 can describe the selected template in a text output using the combination of models deployed at the image-to-text server system. The description of the selected template can be passed back to the LLM, and the LLM interfaces with the video generation server system 130 to determine if the selected template is satisfactory based on the template description. The LLM may ask the video generation server system 130 questions regarding the selected template, and the video generation server system 130 can perform visual question answering on the selected template in response to the questions posed by the LLM. The video generation server system 130 may determine if the selected template is satisfactory by responding to the questions from the LLM. The LLM may proceed with the selected template or select another template based on the responses from the video generation server system 130. In some embodiments, the LLM may have a limited number of questions it can ask before selecting a template to proceed. If the template is deemed satisfactory, process 200 proceeds to generate (260) the requested video based on the template. If the template is deemed unsatisfactory, process 200 repeats steps 240 and 250 by having the video generation server system 130 interfaces with the template server system 140 repeatedly until the selected template is deemed satisfactory.

While specific processes for selecting a template are described above, any of a variety of processes can be utilized to select a template as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 3:
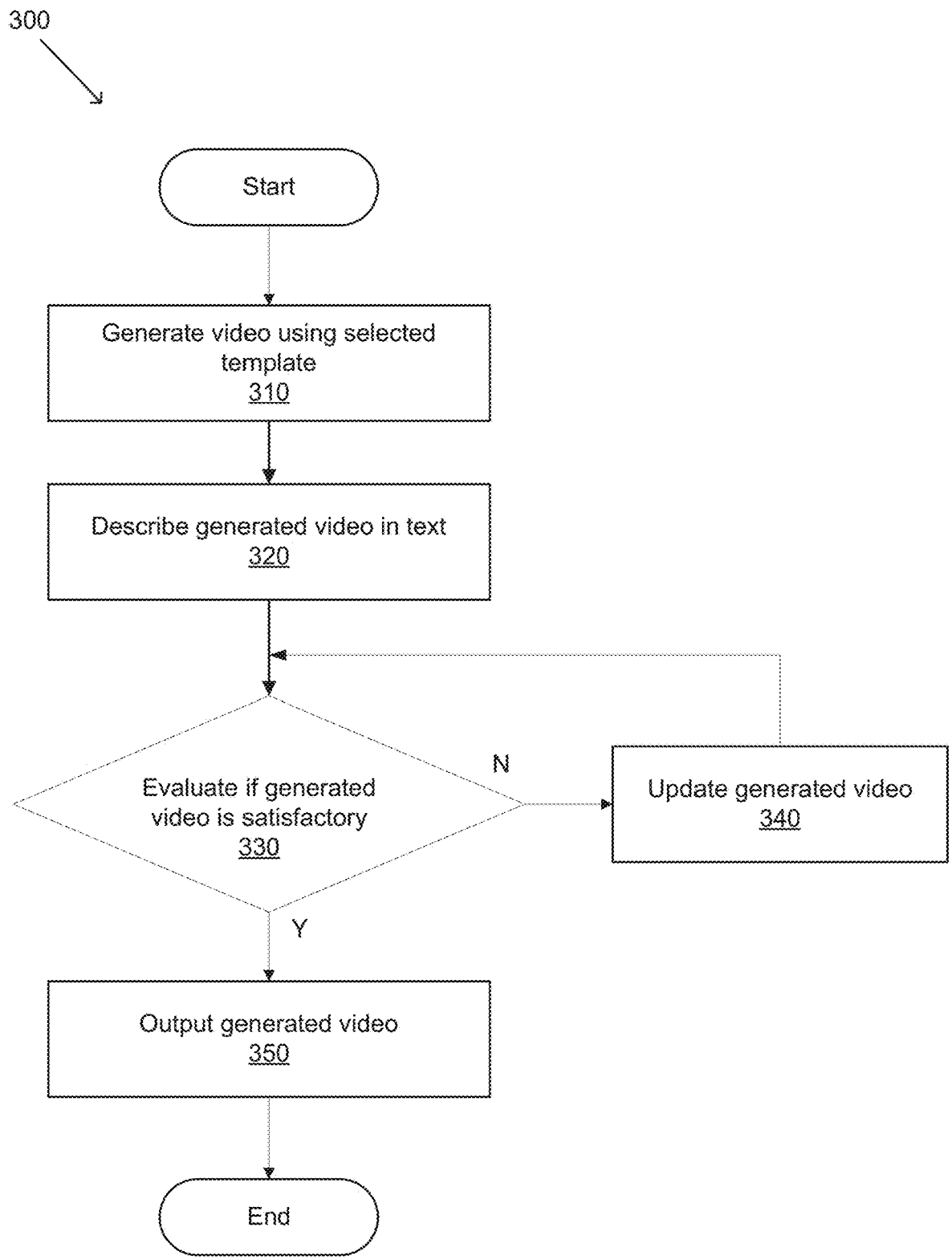
FIG. 3 is a flow chart illustrating a process for generating a video in accordance with an embodiment of the invention.

In numerous embodiments, the system can generate the requested video after the template is selected. A process for generating context-based video in accordance with an embodiment of the invention is illustrated in FIG. 3.

Process 300 generates (310) videos using the selected template. In many embodiments, the video is generated at the video generation server system 130. Process 300 describes (320) the generated video in text. Video generation server system 130 may transmit the generated video to the image-to-text server system 150, where the video can be described in text. Process 300 evaluates (330) if the generated video is satisfactory. In numerous embodiments, this evaluation requires the LLM to interface with the video generation server system 130 to determine if the video is satisfactory based on the description of the generated video and the input text. The LLM may ask the video generation server system 130 questions regarding the generated video, and the video generation server system 130 can perform visual question answering on the generated video in response to the questions posed by the LLM. The video generation server system 130 can determine if the selected template is satisfactory by responding to the questions from the LLM. If the video generation server system 130 deems the generated video to be unsatisfactory, process 300 updates (340) the generated video. Process 300 may repeat steps 330 and 340 until the video generation server system 130 deems that the generated video is satisfactory. If the video generation server system 130 deems the generated video to be satisfactory, process 300 outputs (350) the generated video.

While specific processes for generating context-based video are described above, any of a variety of processes can be utilized to generate context-based video as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 4:
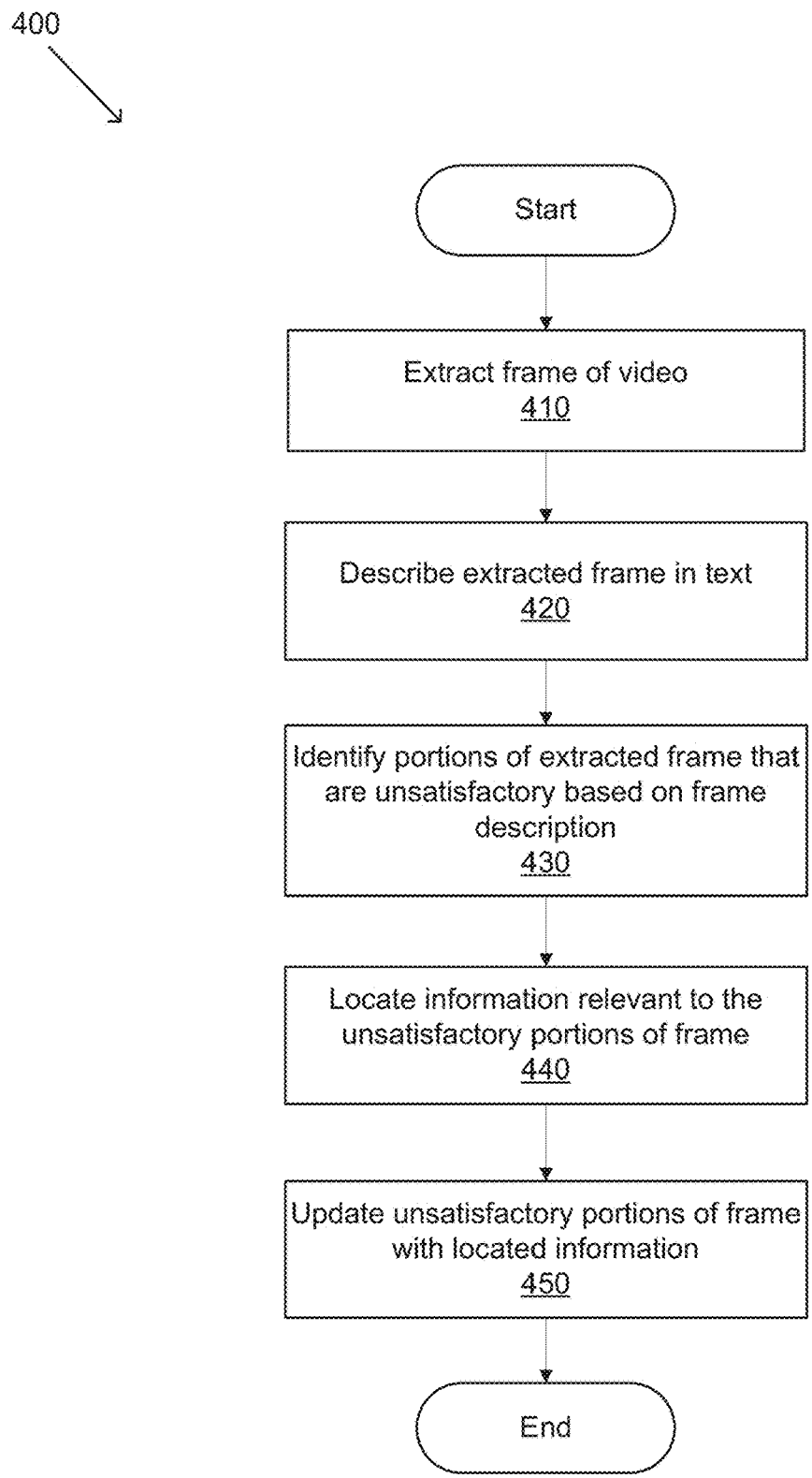
FIG. 4 is a flow chart illustrating a process for updating a generated video to satisfaction in accordance with an embodiment of the invention.

In several embodiments, the video generation server system 130 generates the requested video by rendering a video with placeholders in portions of each frame of the generated video. The LLM can find the appropriate information necessary and update the video frames with the found information during the repeated cycles of steps 330 and 340. A process for updating the generated video in accordance with an embodiment of the invention is illustrated in FIG. 4. Process 400 extracts (410) at least one frame of the generated video. Process 400 describes (420) the at least one extracted frame in text. In numerous embodiments, the extraction and describing of the at least one frame of the generated video is performed by the models deployed at image-to-text server system 150.

Process 400 identifies (430) portions of the at least one extracted frame that are unsatisfactory based on the description of the frame. The image-to-text server system can provide the description of the extracted at least one frame to the LLM and query the LLM, which then queries the video generation server system 130 to determine if the extracted at least one frame is satisfactory. The LLM can identify portions on the at least one frame based on responses from the video generation server system 130 that need to be updated in response to the query. In numerous embodiments, the video generation server system 130 performs an analysis of the extracted at least one frame by reviewing the description provided by the image-to-text server system.

Process 400 can locate (440) information that is relevant to the unsatisfactory portions of the at least one extracted frame. In many embodiments, the LLM may search for information from web-based sources other than the input text to locate information that may be used to update the unsatisfactory portions of the at least one extracted frame. Process 400 can update (450) the unsatisfactory portions of the at least one extracted frame with the located information. The LLM may assemble the frame again by placing located information into the unsatisfactory portions of the at least one extracted frame based on text. Process 400 may be repeated until the LLM deems that the generated video is satisfactory in its content.

While specific processes for updating the generated video are described above, any of a variety of processes can be utilized to update the generated video as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Server Architecture

Figure 5:
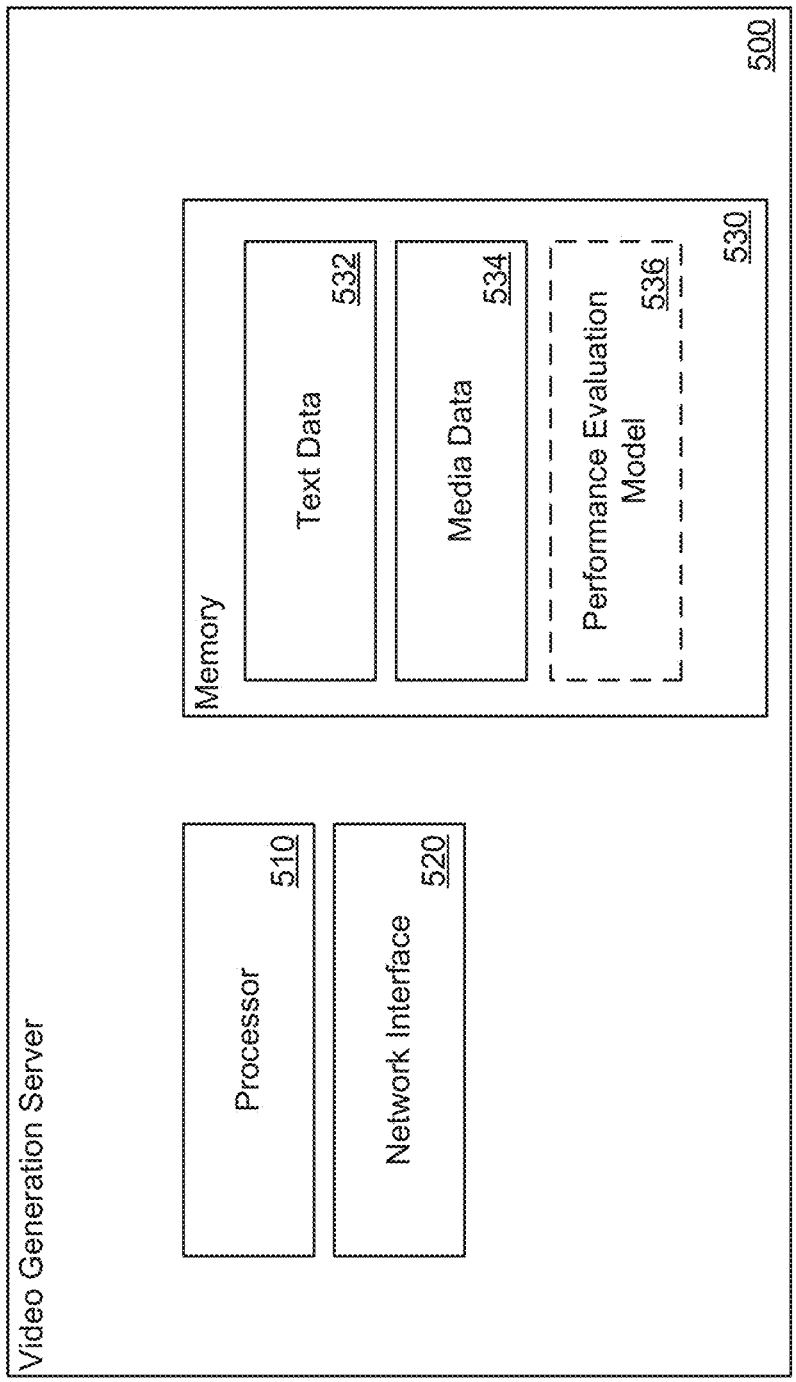
FIG. 5 is a system diagram of a video generation server in accordance with an embodiment of the invention.

A video generation server that executes instructions to perform processes that generate and/or update videos in accordance with an embodiment of the invention is illustrated in FIG. 5. The video generation server 500 includes processor 510, network interface 520, and memory 530. One skilled in the art will recognize that a video generation server may exclude certain components and/or include other components that are omitted for brevity without departing from this invention.

The processor 510 can include (but is not limited to) a processor, microprocessor, controller, or a combination of processors, microprocessors, and/or controllers that perform instructions stored in the memory 530 to manipulate data stored in the memory. Processor instructions can configure the processor 510 to perform processes in accordance with certain embodiments of the invention. In various embodiments, processor instructions can be stored on a non-transitory machine readable medium.

Video generation server 500 can utilize network interface 520 to transmit and receive data over a network based upon the instructions performed by processor 510. Peripherals and/or network interfaces in accordance with many embodiments of the invention can be used to gather inputs that can be used to generate and/or update videos.

Memory 530 may include text data 532, media data 534, and an optional performance evaluation model 536. Performance evaluation model 536 in accordance with several embodiments of the invention can be used to monitor the performance of the generated video. In some embodiments, the engagement level of the generated video on social media may be monitored as performance.

Multimedia data in accordance with a variety of embodiments of the invention can include various types of multimedia data that can be used in evaluation processes. In certain embodiments, multimedia data can include (but is not limited to) video, images, audio, etc.

Although a specific example of a video generation server is illustrated in this figure, any of a variety of video generation servers can be utilized to perform processes for generating and/or updating videos similar to those described herein as appropriate to the requirements of specific applications in accordance with embodiments of the invention.

Figure 6:
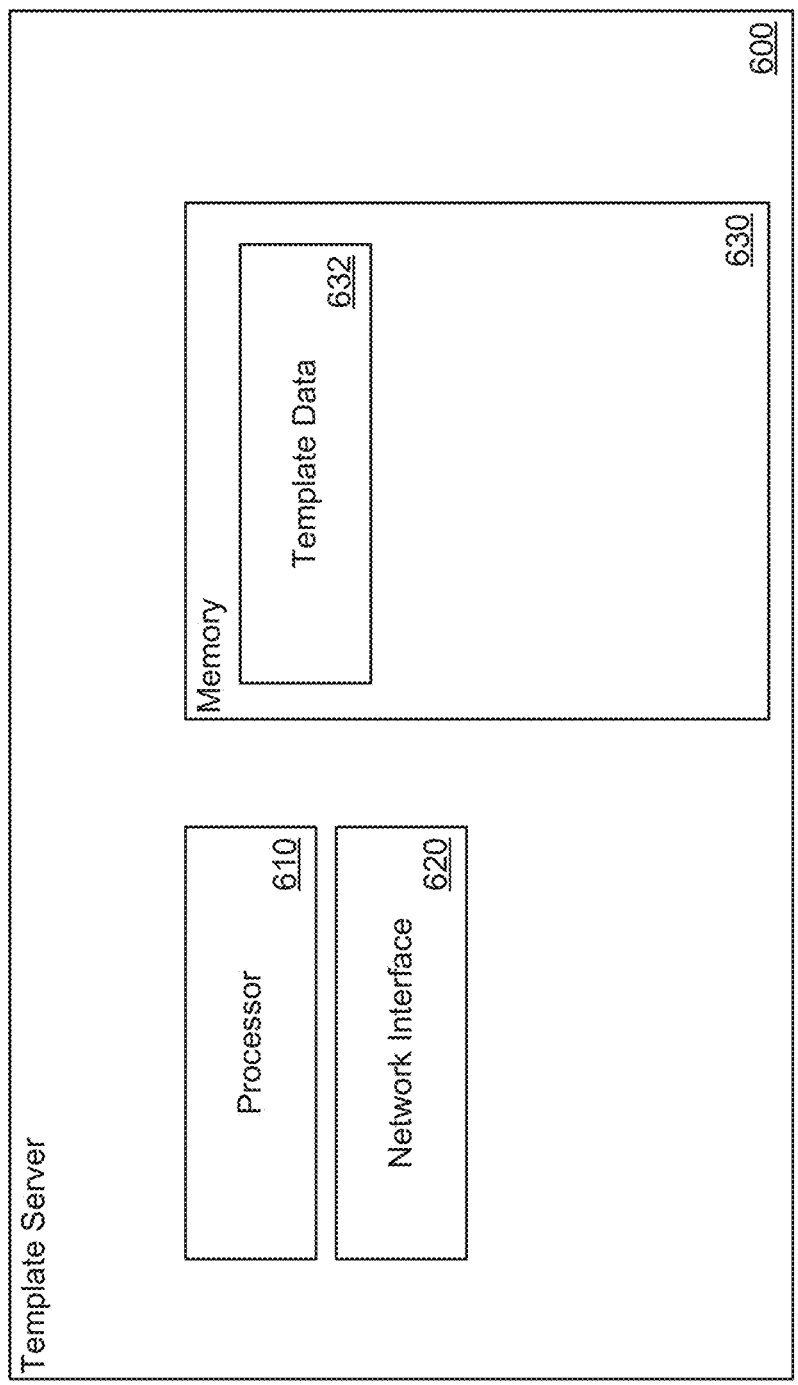
FIG. 6 is a system diagram of a template server in accordance with an embodiment of the invention.

A template server that executes instructions to perform processes that provide templates to the video generation server 500 in accordance with an embodiment of the invention is illustrated in FIG. 6. The template server 600 includes processor 610, network interface 620, and memory 630. One skilled in the art will recognize that a template server may exclude certain components and/or include other components that are omitted for brevity without departing from this invention.

The processor 610 can include (but is not limited to) a processor, microprocessor, controller, or a combination of processors, microprocessor, and/or controllers that performs instructions stored in the memory 630 to manipulate data stored in the memory. Processor instructions can configure the processor 610 to perform processes in accordance with certain embodiments of the invention. In various embodiments, processor instructions can be stored on a non-transitory machine readable medium.

Template server 600 can utilize network interface 620 to transmit and receive data over a network based upon the instructions performed by processor 610. Network interfaces in accordance with many embodiments of the invention can be used to gather inputs that can be used to generate and/or update videos. Memory 630 can include template data 632. In some embodiments, template data are metadata that point to the sources of the templates.

Although a specific example of a template server is illustrated in this figure, any of a variety of template servers can be utilized to perform processes for generating and/or updating videos similar to those described herein as appropriate to the requirements of specific applications in accordance with embodiments of the invention.

Figure 7:
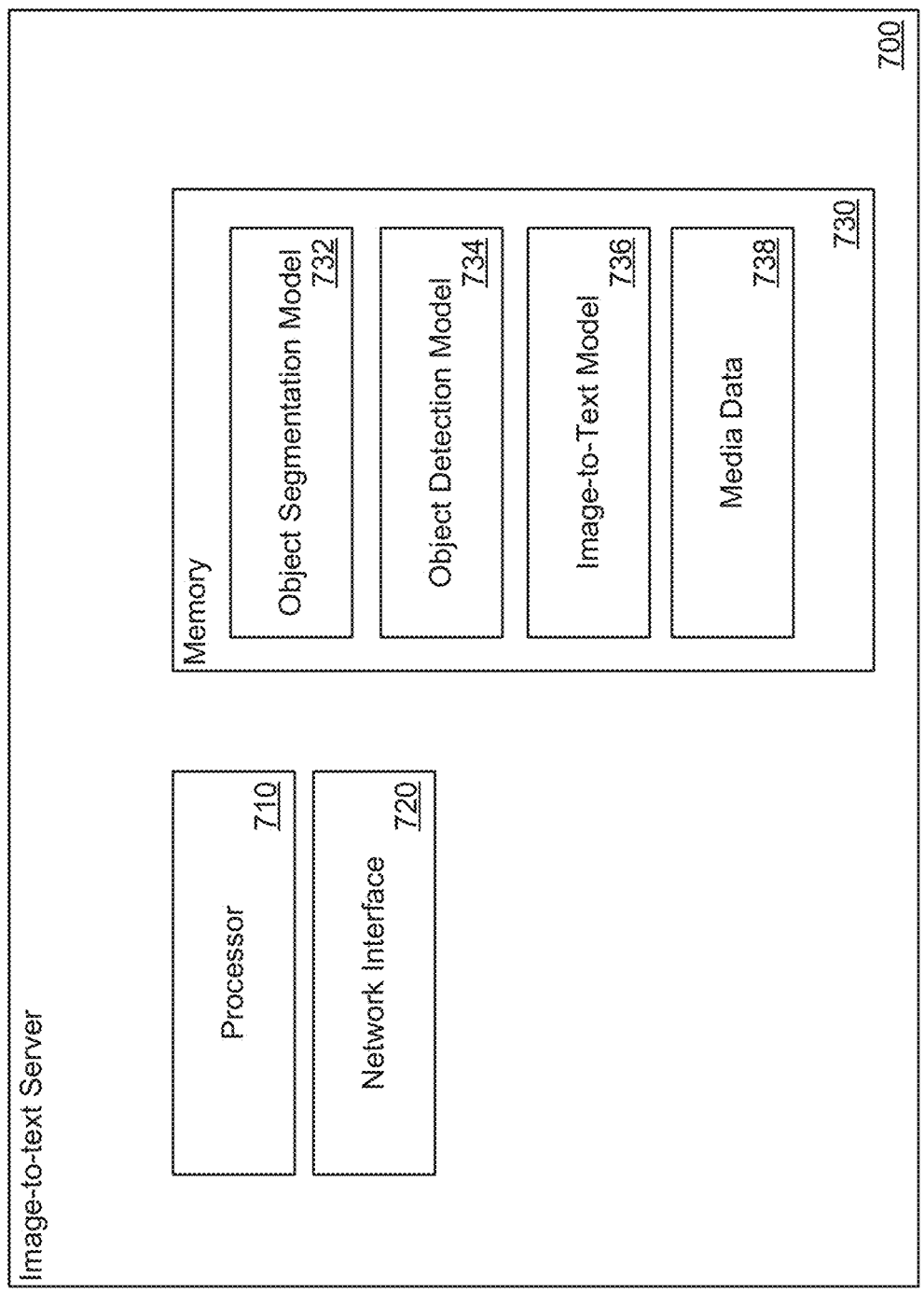
FIG. 7 is a system diagram of an image-to-text server in accordance with an embodiment of the invention.

An image-to-text server that executes instructions to perform processes that describe video in texts in accordance with an embodiment of the invention is illustrated in FIG. 7. The image-to-text server 700 includes processor 710, network interface 720, and memory 730. One skilled in the art will recognize that an image-to-text server may exclude certain components and/or include other components that are omitted for brevity without departing from this invention.

Processor 710 can include (but is not limited to) a processor, microprocessor, controller, or a combination of processors, microprocessors, and/or controllers that perform instructions stored in the memory 730 to manipulate data stored in the memory. Processor instructions can configure the processor 710 to perform processes in accordance with certain embodiments of the invention. In various embodiments, processor instructions can be stored on a non-transitory machine readable medium.

Image-to-text server 700 can utilize network interface 720 to transmit and receive data over a network based upon the instructions performed by processor 710. Network interfaces in accordance with many embodiments of the invention can be used to gather inputs that can be used to describe video in texts.

Memory 730 may include object segmentation model 732, object detection model 734, image-to-text model 736, and media data 738. Object segmentation model 732 in accordance with several embodiments of the invention can be used to classify pixels of video frames based on particular classes of objects. Object detection model 734 can be used to detect the presence of specific objects. In many embodiments, image-to-text model 736 describes images and frames of videos in text. The description provided by the image-to-text model 736 may be based on classification results from the object segmentation model 732 and/or the object detection model 734. Memory 730 can store templates and/or generated video as media data 738.

In several embodiments, memory 730 can store various parameters and/or weights for the models deployed in the image-to-text server that can be used for various processes as described in this specification. Model data, in accordance with many embodiments of the invention can be updated through training on multimedia data or can be trained remotely and updated at the image-to-text server.

Although a specific example of an image-to-text server is illustrated in this figure, any of a variety of image-to-text servers can be utilized to perform processes for generating and/or updating videos similar to those described herein as appropriate to the requirements of specific applications in accordance with embodiments of the invention.

Figure 8:
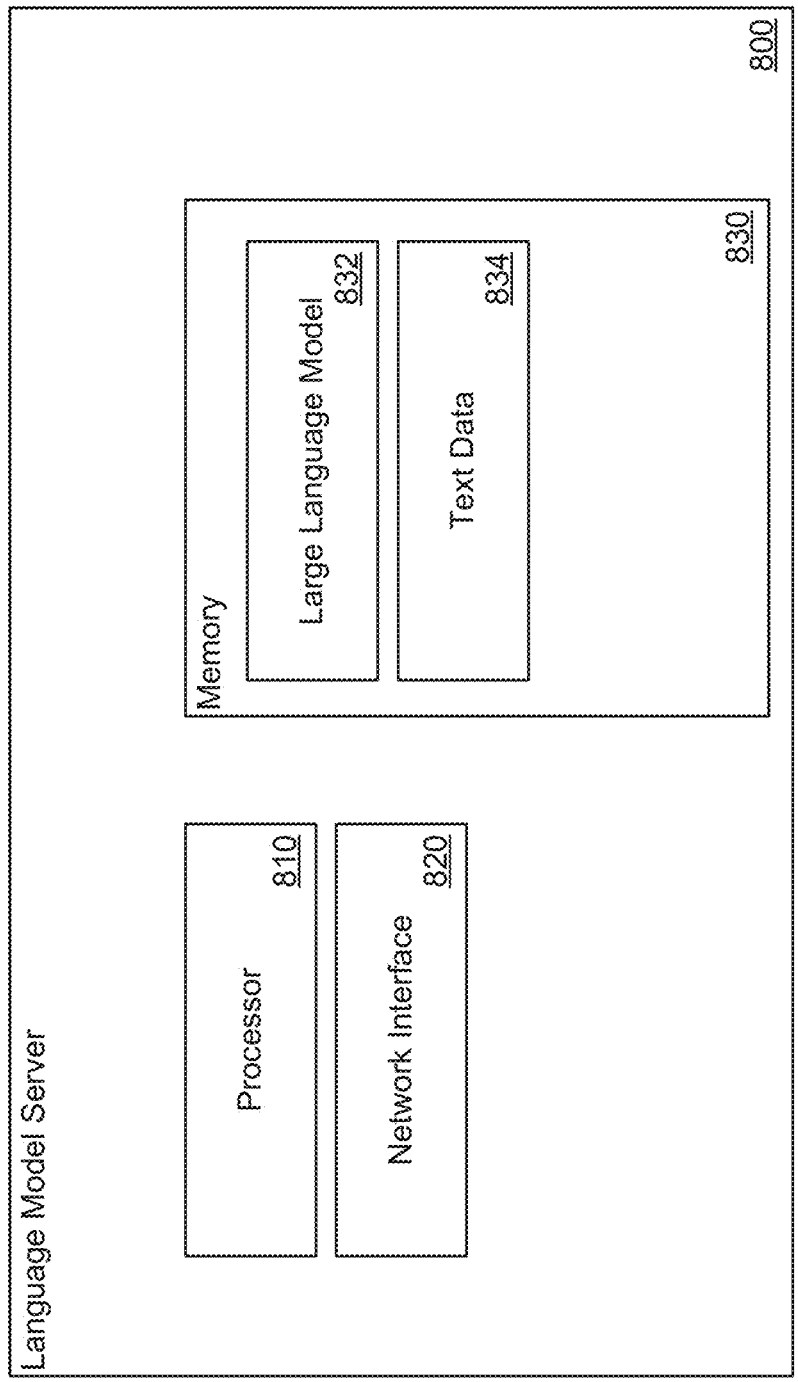
FIG. 8 is a system diagram of a language model server in accordance with an embodiment of the invention.

A language model server that executes instructions to perform processes that process input texts in accordance with an embodiment of the invention is illustrated in FIG. 8. The language model server 800 includes processor 810, network interface 820, and memory 830. One skilled in the art will recognize that a language model server may exclude certain components and/or include other components that are omitted for brevity without departing from this invention.

Processor 810 can include (but is not limited to) a processor, microprocessor, controller, or a combination of processors, microprocessors, and/or controllers that perform instructions stored in the memory 830 to manipulate data stored in the memory. Processor instructions can configure the processor 810 to perform processes in accordance with certain embodiments of the invention. In various embodiments, processor instructions can be stored on a non-transitory machine readable medium.

Language model server 800 can utilize network interface 820 to transmit and receive data over a network based upon the instructions performed by processor 810. Network interfaces in accordance with many embodiments of the invention can be used to gather inputs that can be used to describe video in texts.

Memory 830 may include large language model 832, and text data 834. Large language model 832 in accordance with several embodiments of the invention can be used to summarize input texts. In numerous embodiments, large language model 832 can provide instructions to video generation server 500, template server 600, and image-to-text server 700 to perform processes necessary to generate and update video. Memory 730 can store input texts as text data 834.

In several embodiments, memory 830 can store various parameters and/or weights for the models deployed in the language model server that can be used for various processes as described in this specification. Model data in accordance with many embodiments of the invention can be updated through training on multimedia data or can be trained remotely and updated at the language model server.

Although a specific example of a language model server is illustrated in this figure, any of a variety of language model servers can be utilized to perform processes for processing input texts similar to those described herein as appropriate to the requirements of specific applications in accordance with embodiments of the invention.

Figure 9:
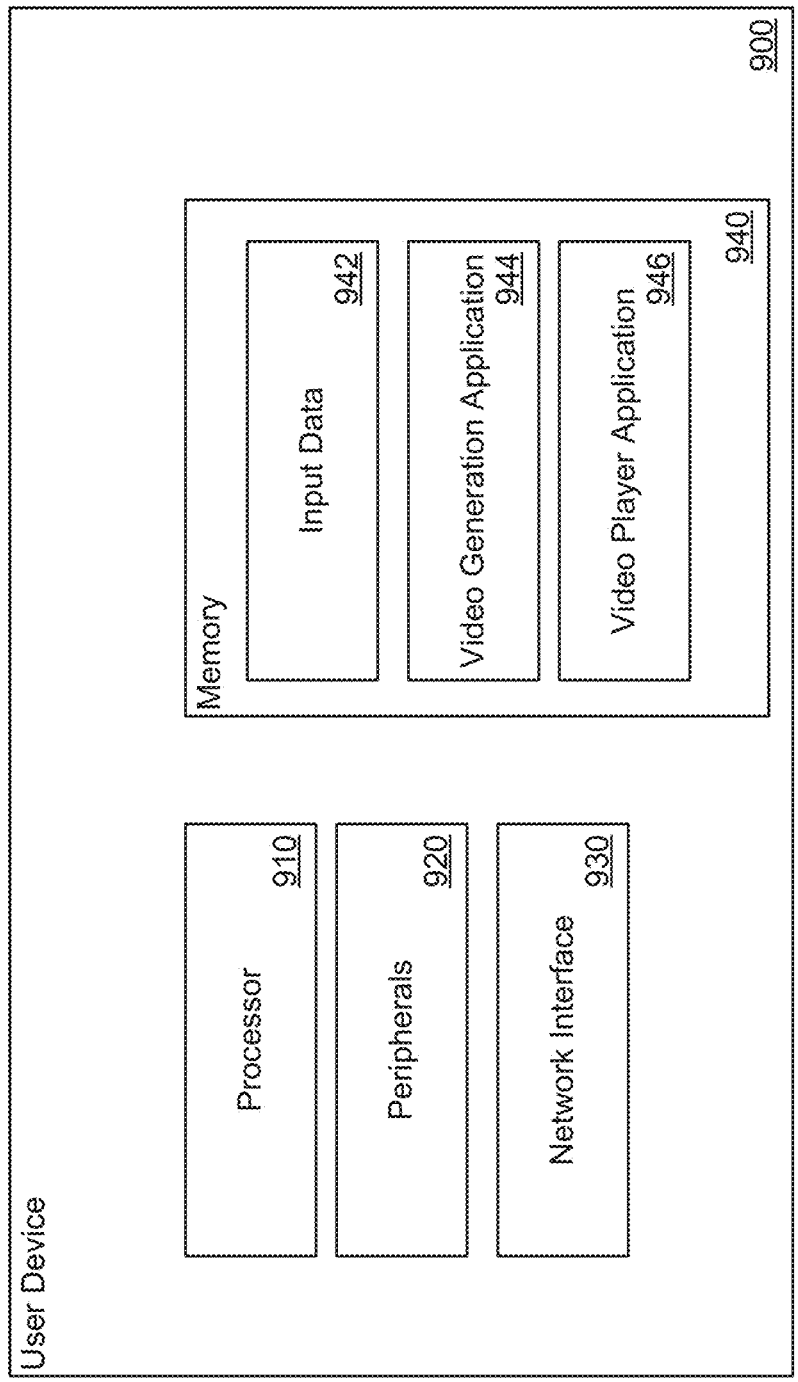
FIG. 9 is a system diagram of a user device in accordance with an embodiment of the invention.

A user device that executes instructions to perform processes that request and generate videos in accordance with an embodiment of the invention is illustrated in FIG. 9. User device 900 in accordance with many embodiments of the invention can include (but are not limited to) one or more mobile devices, cameras, and/or computers. User device 900 includes processor 910, peripherals 920, network interface 930, and memory 940. One skilled in the art will recognize that a video generation server may exclude certain components and/or include other components that are omitted for brevity without departing from this invention.

Processor 910 can include (but is not limited to) a processor, microprocessor, controller, or a combination of processors, microprocessors, and/or controllers that perform instructions stored in memory 940 to manipulate data stored in the memory. Processor instructions can configure the processor 910 to perform processes in accordance with certain embodiments of the invention. In various embodiments, processor instructions can be stored on a non-transitory machine readable medium.

Peripherals 920 can include any of a variety of components for capturing data, such as (but not limited to) cameras, displays, and/or sensors. In a variety of embodiments, peripherals can be used to gather inputs and/or provide outputs. User device 900 can utilize network interface 930 to transmit and receive data over a network based upon the instructions performed by processor 910. Peripherals and/or network interfaces in accordance with many embodiments of the invention can be used to gather inputs that can be used to request and generate videos.

Memory 940 includes input data 942, video generation application 944, and video player application 946. Multimedia data in accordance with a variety of embodiments of the invention can include various types of multimedia data that can be used in evaluation processes. In certain embodiments, multimedia data can include (but is not limited to) video, images, audio, etc.

Although a specific example of a user device 900 is illustrated in this figure, any of a variety of user devices can be utilized to perform processes for requesting and generating video similar to those described herein as appropriate to the requirements of specific applications in accordance with embodiments of the invention.

Figure 10:
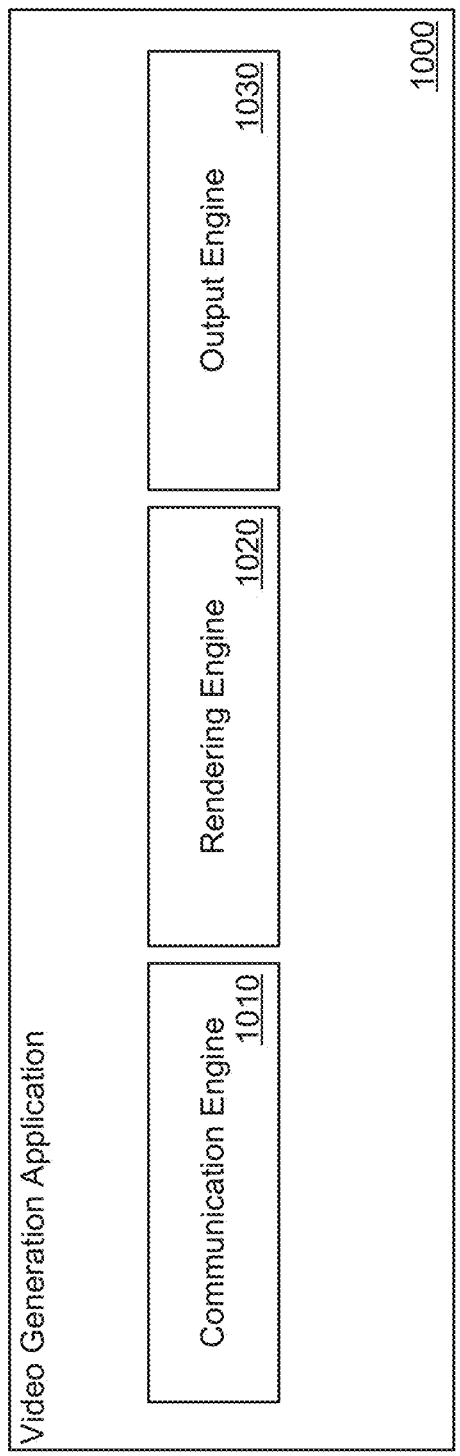
FIG. 10 is a system diagram of a video generation application in accordance with an embodiment of the invention.

An example of a video generation application for generating videos in accordance with an embodiment of the invention is illustrated in FIG. 10. Video generation application 1000 includes communication engine 1010, rendering engine 1020, and output engine 1030. One skilled in the art will recognize that a video generation application may exclude certain components and/or include other components that are omitted for brevity without departing from this invention.

Communication engine 1010 in accordance with various embodiments of the invention can be used to communicate input texts to the various server systems. Communication engine 1010 can coordinate the various servers to generate the requested video. In several embodiments, rendering engine 1020 can render the selected template and the generated video. The user may view and determine if the selected template and generated video are satisfactory. Output engines 1030 in accordance with several embodiments of the invention can provide a variety of outputs to a user, including (but not limited to) generated videos.

Although a specific example of a video generation application is illustrated in this figure, any of a variety of video generation applications can be utilized to perform processes for generating videos similar to those described herein as appropriate to the requirements of specific applications in accordance with embodiments of the invention.

Although specific methods of context-based video generation are discussed above, many different methods of context-based video generation can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for generating context-based video, comprising:
   a language model server comprising a set of one or more processors configured to:
      receive an input describing a video to be generated;
      determine a theme of the video to be generated based on the input;
      request the video to be generated based on the determined theme and the input; and
      query a video generation server to determine if the generated video is satisfactory;
   the video generation server comprising a set of one or more processors configured to:
      receive the video generation request;
      select a template from a template server based on the request;
      generate a video based on the selected template and the input; and
      evaluate if the generated video is satisfactory in response to the query from the language model server; and
   an image-to-text server comprising a set of one or more processors configured to:
      extract a frame of the generated video;
      describe the extracted frame in text;

identify portions of the extracted frame that are unsatisfactory based on description of the extracted frame;
locate information relevant to the unsatisfactory portions of the extracted frame; and
update unsatisfactory portions of the extracted frame with located information.

2. The system of claim 1, wherein the template server comprises metadata to Adobe After Effects templates.

3. The system of claim 1, wherein the image-to-text server comprises a BLIP-2 model.

4. The system of claim 1, wherein evaluating whether the generated video is satisfactory comprises:
describing the generated video in text; and
scoring the similarity of the description of the video against the input text.

5. The system of claim 1, wherein the language model server is further configured to generate summaries of the input text,
wherein the generated summaries are labeled to correct hallucination errors.

6. The system of claim 1, wherein the language model server is further configured to determine whether the template selected by the video generation server is satisfactory.

7. The system of claim 6, wherein the language model server determines whether the template selected by the video generation server is satisfactory by querying the video generation server, wherein the video generation server answers the queries from the language model server by performing visual question answering.

8. The system of claim 1, wherein the video generation server generates the video by rendering the video with placeholders in portions of each frame of the generated video.

9. The system of claim 1, wherein locating information relevant to the unsatisfactory portions of the extracted frame comprises searching, using the language model server, for information from web-based sources other than the input text to locate information to be used to update the unsatisfactory portions of the extracted frame.

10. The system of claim 1, wherein updating unsatisfactory portions of the extracted frame with located information is performed repeatedly until the language model server determines the generated video is satisfactory.

11. A method for generating context-based video, the method comprising:
receiving an input describing a video to be generated;
determining a theme of the video to be generated based on the input;
transmitting a request video to be generated based on the determined theme and the input;
selecting a template from a template server based on the request;
generating a video based on the selected template and the input;
evaluating if the generated video is satisfactory, wherein evaluating if the generated video is satisfactory further comprises:
extracting a frame of the generated video;
describing the extracted frame in text;
identifying portions of the extracted frame that are unsatisfactory based on description of the extracted frame;
locating information relevant to the unsatisfactory portions of the extracted frame; and
updating unsatisfactory portions of the extracted frame with located information; and
outputting the generated video that is deemed satisfactory.

12. The method of claim 11, wherein the template server comprises metadata to Adobe After Effects templates.

13. The method of claim 11, wherein evaluating whether the generated video is satisfactory comprises:
describing the generated video in text; and
scoring the similarity of the description of the video against the input.

14. The method of claim 11, further comprising generating summaries of the input text,
wherein the generated summaries are labeled to correct hallucination errors.

15. The method of claim 11, further comprising determining whether the template selected is satisfactory.

16. The method of claim 15, wherein determining whether the template selected is satisfactory comprises:
querying whether the template selected is satisfactory; and
answering the queries by performing visual question answering.

17. The method of claim 11, wherein the video generation server generates the video by rendering the video with placeholders in portions of each frame of the generated video.

18. The method of claim 11, wherein locating information relevant to the unsatisfactory portions of the extracted frame comprises searching for information from web-based sources other than the input text to locate information to be used to update the unsatisfactory portions of the extracted frame.

19. The method of claim 11, wherein updating unsatisfactory portions of the extracted frame with located information is performed repeatedly until the generated video is determined to be satisfactory.

20. A system for generating context-based video, comprising:
a language model server comprising a set of one or more processors configured to:
receive an input describing a video to be generated;
request the video to be generated based on the input; and
query a video generation server to determine if the generated video is satisfactory;
the video generation server comprising a set of one or more processors configured to:
receive the video generation request;
receive a description of a template to be used for the video to be generated;
select a template from a template server based on the request and the description;
generate a video based on the selected template and the input; and
evaluate if the generated video is satisfactory in response to the query from the language model server; and
an image-to-text server comprising a set of one or more processors configured to:
extract a frame of the generated video;
describe the extracted frame in text;
identify portions of the extracted frame that are unsatisfactory based on description of the extracted frame;
locate information relevant to the unsatisfactory portions of the extracted frame; and
update unsatisfactory portions of the extracted frame with located information.

* * * * *